United States Patent [19]
Blum

[11] Patent Number: 6,141,106
[45] Date of Patent: Oct. 31, 2000

[54] MEASURING DEVICE FOR SCANNING DIMENSIONS, ESPECIALLY DIAMETERS

[75] Inventor: Günther Blum, Ravensburg, Germany

[73] Assignee: Blum-Novotest GmbH, Grunkraut-Gullen, Germany

[21] Appl. No.: 09/269,838
[22] PCT Filed: Sep. 4, 1998
[86] PCT No.: PCT/EP98/05647
   § 371 Date: Apr. 1, 1999
   § 102(e) Date: Apr. 1, 1999
[87] PCT Pub. No.: WO99/13292
   PCT Pub. Date: Mar. 18, 1999

[30] Foreign Application Priority Data

Sep. 5, 1997 [DE] Germany ............... 197 38 977

[51] Int. Cl.[7] .................................. G01B 11/08
[52] U.S. Cl. ............................ 356/384; 356/287
[58] Field of Search .................... 356/384, 385, 356/386, 387, 426; 250/560; 33/201, 203, 626, 639, 632

[56] References Cited

U.S. PATENT DOCUMENTS

| | | |
|---|---|---|
| 3,555,288 | 1/1971 | Morenius . |
| 3,749,500 | 7/1973 | Carlson et al. . |
| 3,922,094 | 11/1975 | Colding et al. ............ 356/385 |
| 4,678,337 | 7/1987 | Cohen et al. ............. 356/387 |
| 4,753,532 | 6/1988 | Aldred ................. 356/385 |
| 5,005,978 | 4/1991 | Skunes et al. ........... 356/372 |
| 5,175,595 | 12/1992 | Fukase ................ 356/387 |
| 5,336,898 | 8/1994 | Ettelbrueck . |
| 5,841,542 | 11/1998 | Milana et al. ........... 356/384 |

FOREIGN PATENT DOCUMENTS

| | | |
|---|---|---|
| 0 439 907 A2 | 8/1991 | European Pat. Off. . |
| 36 30 702 A1 | 3/1988 | Germany . |
| 42 24 253 C1 | 3/1994 | Germany . |
| 42 38 504 A1 | 5/1994 | Germany . |

OTHER PUBLICATIONS

High–Speed Laser Scan Micrometer LS–5000 Series, 1996, Japan.
SLB Dia Measuring System KL150 Series, 1990, Japan.
Derwent–Abstract of DE 36 30 702 A, Germany.
Derwent–Abstract of DE 42 38 504 A, Germany.

*Primary Examiner*—Hoa Q. Pham
*Attorney, Agent, or Firm*—Clifford W. Browning; Woodard, Emhardt, Naughton Moriarty & McNett

[57] ABSTRACT

The measuring instrument comprises a retaining fixture adapted to hold an object to be measured in a center plane of the measuring instrument, defined by a guide, in such a position that a dimension of interest will extend parallel to the guide. A carriage supporting a transmitter and a receiver, respectively, at either side of the center plane for an energy beam focused on the center plane is movable along the guide. A distance measuring device provided to measure movements of the carriage along the guide comprises a rule member which is disposed in the center plane. The dimension of interest is determined based on positions of the carriage at which the energy beam, first received by the receiver, is interrupted by the object to be measured and then again received.

5 Claims, 6 Drawing Sheets

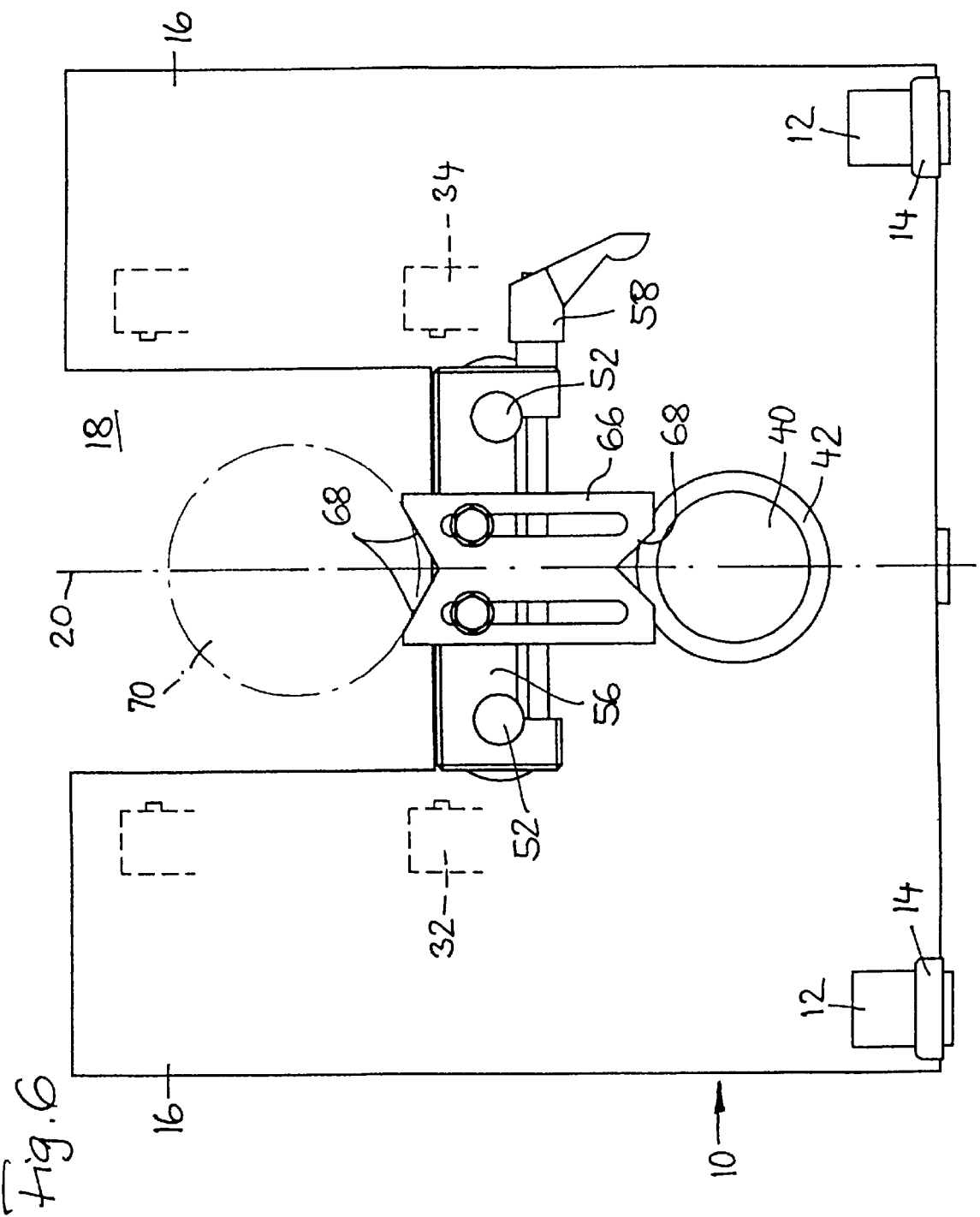

MEASURING DEVICE FOR SCANNING DIMENSIONS, ESPECIALLY DIAMETERS

BACKGROUND OF THE INVENTION

A known measuring instrument of this kind (DE 42 24 253 C1) devised for measuring cylinders of printing presses comprises a carriage which is arranged below and parallel to a bridge of a crane assembly which bridge moves on two rails. Two guide members protrude downwardly from the bridge, and the carriage is guided on them so as to be movable in vertical direction. A distance measuring means which measures the vertical movements of the carriage is arranged outside of the space between the two guide members. The carriage constitutes a transverse beam on which a retaining fixture is movable parallel to the bridge, in other words horizontally. The retaining fixture supports a dual limb bracket in such a way that the latter can be swung back and forth between operative and inoperative positions. When in operative position, the two limbs of the bracket extend vertically downwards so that the bracket forms an inverted U which is open at the bottom. In the inoperative position, the limbs of the bracket extend horizontally and parallel to the transverse base of the bracket. Transmitter and receiver elements, respectively, of a light barrier are arranged at the ends of the two limbs of the bracket. The spacing between these elements is greater than the greatest diameter to be expected of the printing cylinders which are to be measured. A printing cylinder to be measured is placed on a support below the transverse beam of the carriage and parallel to the same so that the bracket which has been pivoted downwards into its operative position will embrace the printing cylinder as the carriage is lowered. The distance by which the carriage is lowered while the printing cylinder interrupts the light barrier is taken as the measure of the printing cylinder diameter.

Likewise known (U.S. Pat. No. 3,555,288) is an instrument for the photoelectric classification of objects, like sections of tree trunks. In this case the objects are movable on a guide means through a U-shaped, stationary rack. The rack comprises two hollow legs extending vertically upwardly from a horizontal transverse member, likewise being hollow, and they each include a vertical guide bar. On each of these two guide bars a carriage is movable up and down. One of these carriages carries a transmitter and the other one a receiver of a horizontal light barrier which is interrupted by the object to be measured. A motor is housed inside the transverse member to serve as the common drive of both carriages. The motor acts through a gear box on two chain drives mounted one each in the two legs of the rack and connected to a respective one of the two carriages.

The measuring accuracies obtainable with the two instruments described above are limited, both because of their structure and their designated purpose.

SUMMARY OF THE INVENTION

It is, therefore, the object of the invention to devise a measuring instrument for use in scanning dimensions, especially diameters, which instrument provides signals suitable to be evaluated with little computer expenditure and yet offering precise results of the measurements taken.

The object is met, in accordance with the invention, by a measuring instrument to scan dimensions, and particularly diameters of objects to be measured, comprising a guide means which defines a center place of the measuring instrument, a retaining fixture having means to hold an object to be measured in the center plane in such position that a dimension of interest will extend parallel to the guide means, a carriage supporting a transmitter at one side of the center place and a receiver at the other side for an energy beam which passes transversely of the center plane and of the dimension of interest, a distance measuring means to measure movements of the carriage along the guide means, and an evaluating means to determine the dimension of interest based on positions of the carriage at which the energy beam, first received by the receiver, is interrupted by the object to be measured and then again received, characterized in that the energy beam is focused on the center plane, and the distance measuring means carries a rule member which is disposed in the center place. Advantageous further developments may be gathered from the subclaims.

BRIEF DESCRIPTION OF THE DRAWINGS FIGURES

Embodiments of the invention will be described in greater detail below, with reference to diagrammatic drawings, in which:

FIG. 6 shows the embodiment of FIG. 5 in front elevation similar to FIG. 2.

DETAILED DESCRIPTION OF THE PREFERRED EMBODIMENTS

Figure 1:
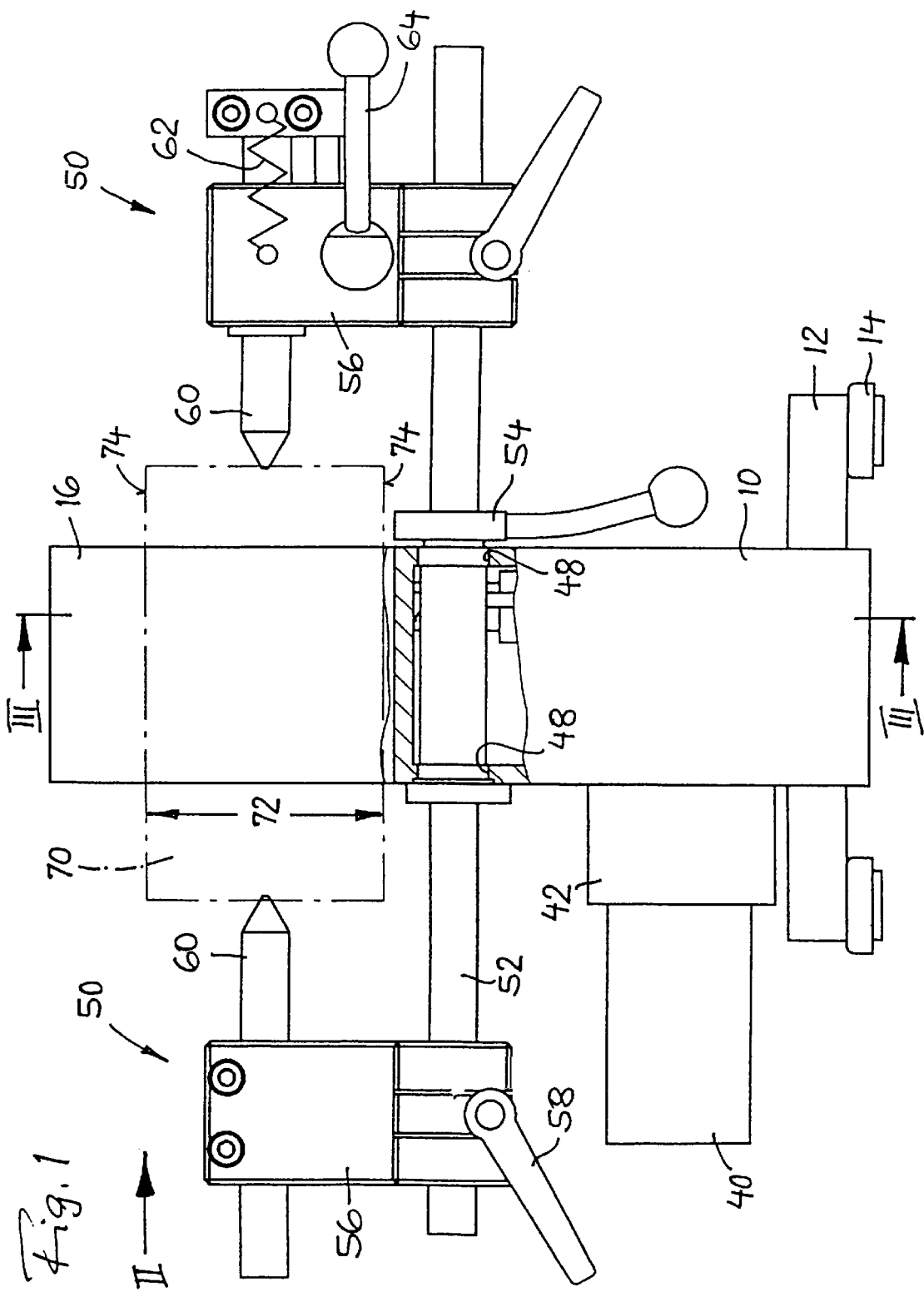
FIG. 1 is a side elevation of a measuring instrument according to the invention.
Figure 2:
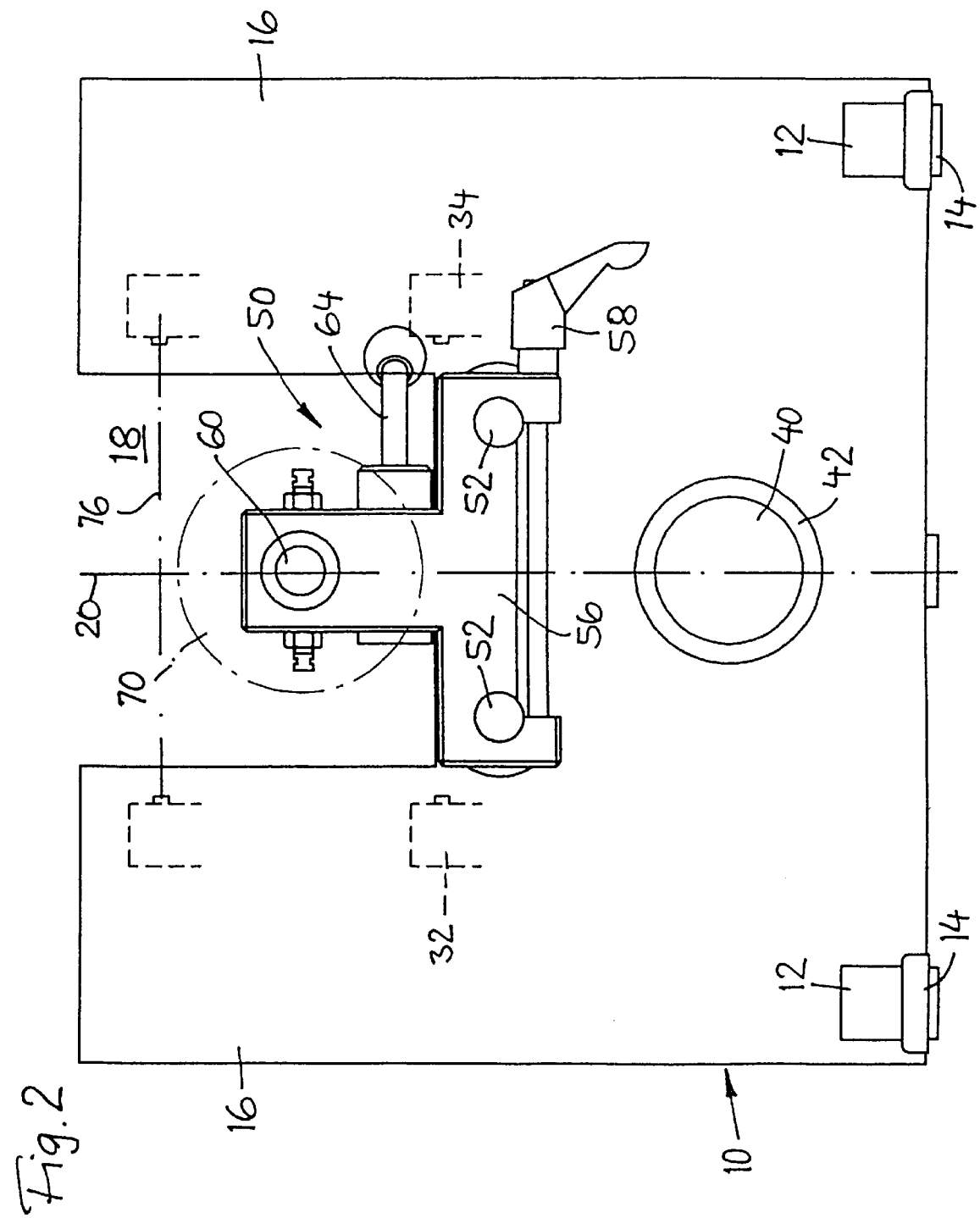
FIG. 2 is the front elevation seen in the direction of arrow II in FIG. 1.

The measuring instrument illustrated in FIGS. 1 to 4 comprises a housing 10 which is U-shaped when seen from the front, as presented in FIG. 2, and has four legs 12 including an elastic foot 14 each. The housing 10 comprises two hollow turrets 16 of parallelepiped configuration between which an intermediate space 18 is defined, likewise shaped like a parallelepiped. The entire housing 10 and most of the built-in structures are symmetrical with respect to a vertical center plane 20. The two turrets 16 each are open towards the intermediate space 18 through a vertical slot 22.

Figure 3:
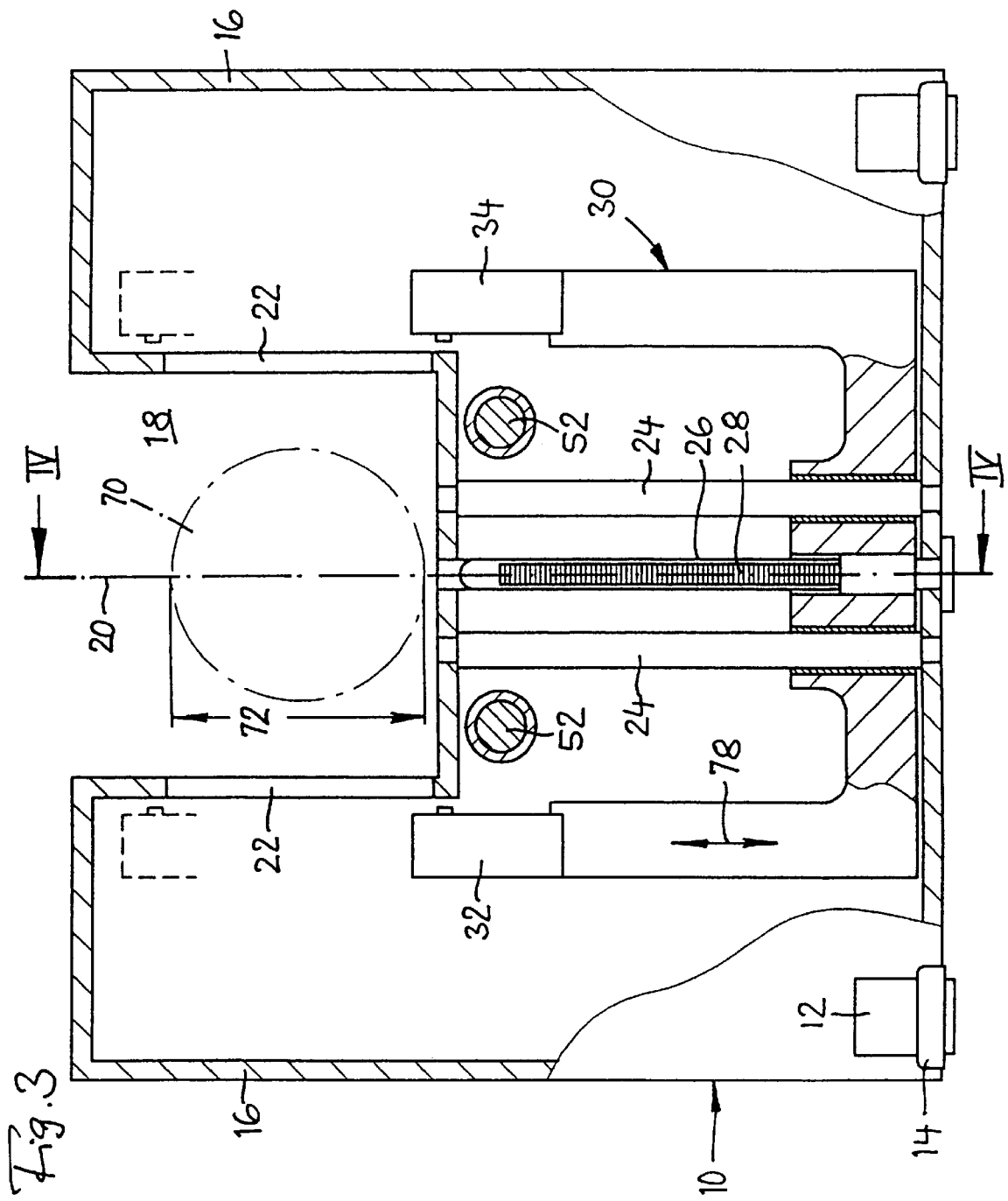
FIG. 3 is the vertical cross section III—III of FIG. 1.

A pair of pillars 24 are mounted in upright position, symmetrically with respect to the center plane 20, within the central region of the housing 10, and between them a rule member 26 provided with an incremental scale 28 is disposed vertically. The pillars 24 guide a carriage 30 which is U-shaped like the housing, as shown in FIG. 3, and movable in vertical direction. A transmitter 32 and a receiver 34 for laser beams are mounted on the carriage 30 at either side of the center plane 20 and so as to be aligned with the slots 22. In its lower middle region the carriage 30 further carries a scanning head 36 which constitutes a digital distance measuring means in cooperation with the scale 28.

Figure 4:
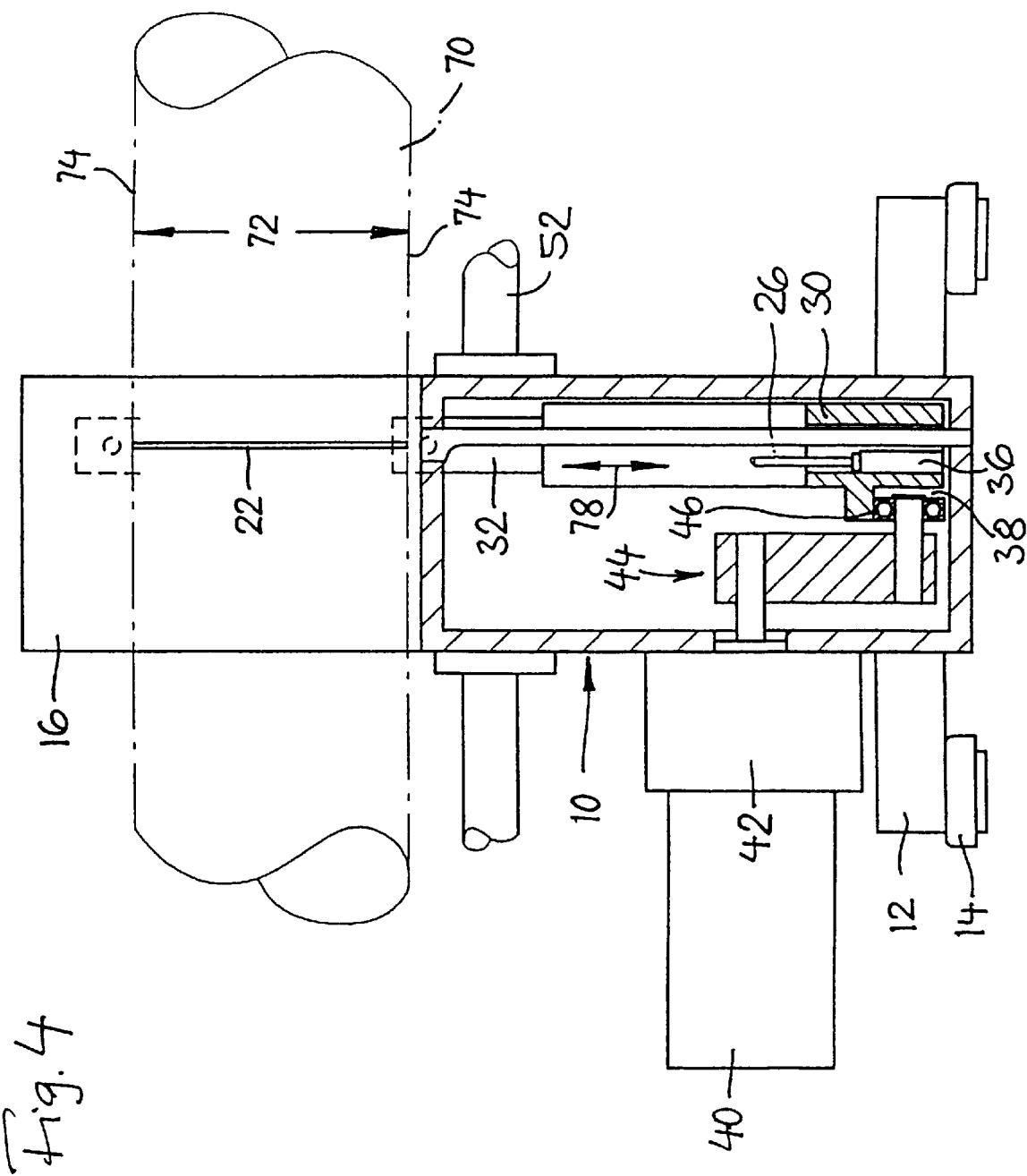
FIG. 4 is the vertical longitudinal section IV—IV of FIG. 3.

One side of the carriage 30 is formed with a horizontal groove 38 extending in longitudinal direction and running parallel to the plane of the drawings of FIGS. 1 and 4. The housing 10 has a motor 40 built onto it, preferably an electric d.c. motor, which acts through a reduction gear 42 and a crank drive 44 arranged within the housing 10 to drive a roller 46. The roller 46 engages in the horizontal groove 38 so that the carriage 30 will effect vertical reciprocating movements when the motor 40 is operating.

The housing 10 further includes a pair of horizontal apertures 48 extending in longitudinal direction, parallel and symmetrical to the center plane 20 and serving as supports for a retaining fixture 50. In the embodiment shown, the retaining fixture 50 comprises two parallel, horizontal rods 52 secured to the housing 10 by a clamping device 54 so as to be exchangeable and carrying two brackets 56. The brackets 56 are adjustable along the rods 52 and adapted to be fixed in position by a toggle 58 each.

In the case of the measuring instrument illustrated in FIGS. 1 to 4, the two brackets 56 each carry a mandrel 60 whose tip is located in the vertical center plane 20. One of the mandrels 60 is guided so as to be movable longitudinally in its bracket 56, it is biased towards the housing 10 by a spring 62 and adapted to be withdrawn by a toggle 64. The other mandrel 60 is clamped to begin with to the corresponding bracket 56 in a selectable position.

Figure 5:
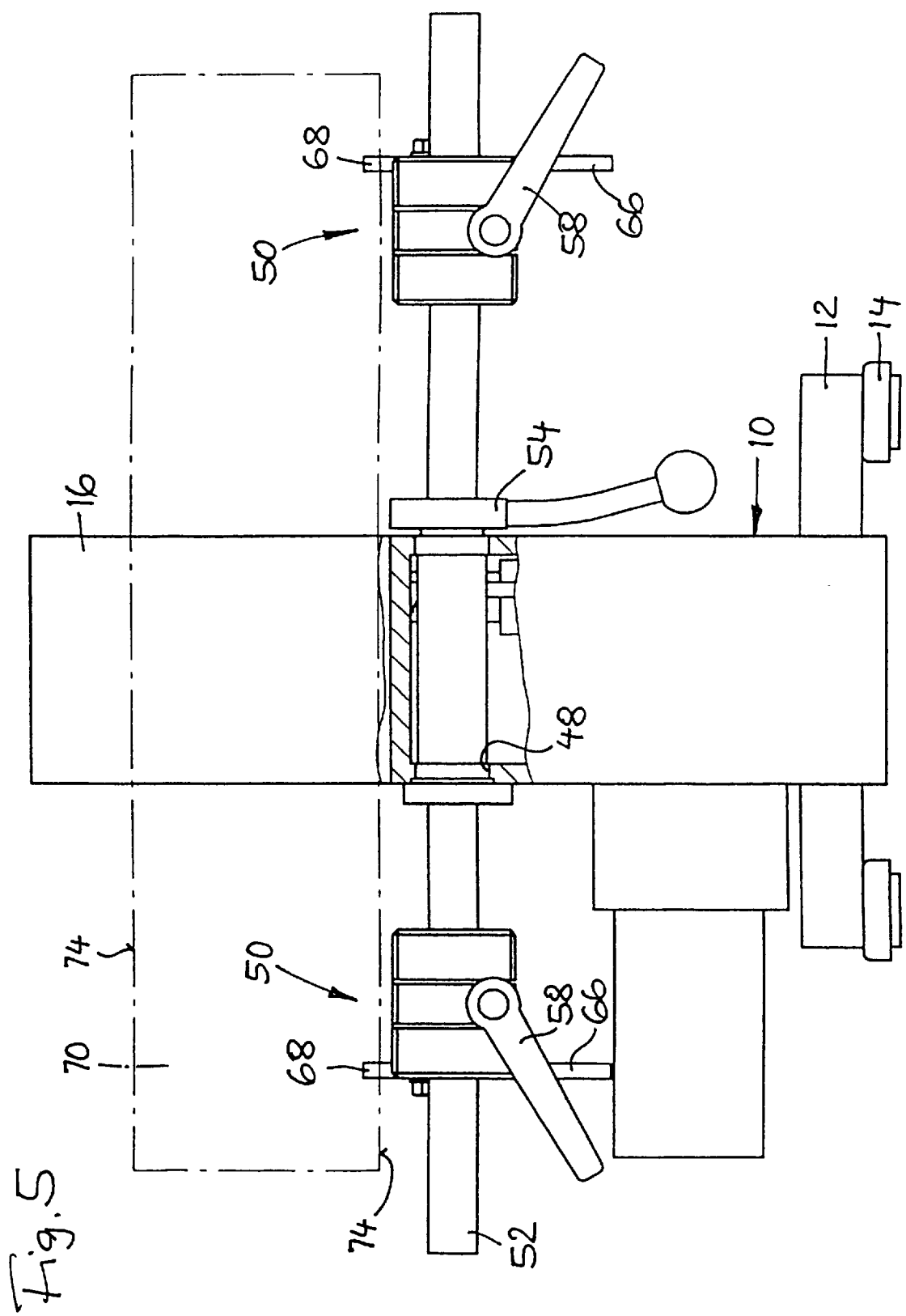
FIG. 5 shows a modified embodiment of the measuring instrument according to the invention, in side elevation similar to FIG. 1.

The measuring instrument according to FIGS. 5 and 6 differs from the one illustrated in FIGS. 1 to 4 only in that instead of a mandrel 60, the two brackets 56 each carry a plate 66 which is adjustable in height and formed with supporting prisms 68.

According to FIGS. 1 to 4, an object to be measured 70, presented here as a cylindrical shaft, is clamped centrally between the mandrels 60. According to FIGS. 5 and 6, on the other hand, the object to be measured 70, again a cylindrical shaft, is placed on two of the supporting prisms 68. In both instances the object to be measured 70 is positioned symmetrically with respect to the center plane 20 of the measuring instrument so that a dimension to be measured 72, in the example shown a diameter to be measured in the center plane 20, i.e. vertically, lies within a level ranging from the lower to the upper limits of the slots 22. The dimension 72 is determined by having an energy beam 76 which exits from the transmitter 32 and passes through the slots 22 scan the contours 74 of the object to be measured 70, visible in the side elevations of FIGS. 1, 4, and 5. The energy beam 76 preferably is a laser beam in the red light region and it is focused in the center plane 20.

When an object to be measured has been clamped between the mmandrels 60, in accordance with FIGS. 1 to 4, or positioned on two supporting prisms 68, in accordance with FIGS. 5 and 6, the transmitter 32 is switched on and the motor 40 started to operate for a period of time during which the crank drive 44 carries out at least one full revolution. During this time, the carriage is moved upwardly in the direction of arrow 78, starting from its lower dead center position, shown in full lines in FIGS. 3 and 4, into its upper dead center position, indicated in dash-dot lines, and back into its lower dead center position. During the upward movement, the energy beam 76 emitted by the transmitter 32 in a direction perpendicular to the center plane 20 and, at first, received by the receiver 34 is interrupted by the object to be measured 70. The position of the carriage 30 at which that happens, as determined by the distance measuring means 28, 36, corresponds to the location of the lower contour 74 of the object to be measured 70. This position is memorized. In the further course of the upward movement of the carriage 30, the energy beam 76 which the transmitter 32 continues to radiate is received once more by the receiver 34 as soon at it has reached the upper contour 74 of the object to be measured 70. Again, the position of the carriage 30 at which that happens, as determined by the distance measuring means 28, 36, is memorized. The dimension 72 is derived from the memorized values; in the example shown, this is the diameter of the object measured 70. The measurements may be repeated during the downward movement of the carriage 30, and their results may be interpolated with the results of the measurements taken during the upward stroke.

It is likewise possible to select measuring programs with which the carriage 30 carries out a plurality of up and down movements and a corresponding greater selection of results are obtained from the measurements and finally interpolated.

What is claimed is:

1. A measuring instrument to scan dimensions, and particularly diameters of objects to be measured, comprising a guide means which defines a center plane of the measuring instrument, a retaining fixture having means to hold an object to be measured in the center plane in such position that a dimension of interest will extend parallel to the guide means, a carriage supporting a transmitter at one side of the center plane and a receiver at the other side for an energy beam which passes transversely of the center plane and of the dimension of interest, a distance measuring means to measure movements of the carriage along the guide means, and an evaluating means to determine the dimension of interest based on positions of the carriage at which the energy beam, first received by the receiver, is interrupted by the object to be measured and then again received, characterized in that the energy beam is focused on the center plane, and the distance measuring means carries a rule member which is disposed in the center plane.

2. The measuring instrument as claimed in claim 1, characterized in that the energy beam is a laser beam.

3. The measuring instrument as claimed in claim 1 or 2, characterized in that the carriage is guided on a pair of pillars disposed at either side of the center plane.

4. The measuring instrument as claimed in claim 1 or 2, characterized in that the retaining fixture comprises a pair of rods which extend at either side of the center plane and parallel to the same and which carry adjustable brackets for the object to be measured.

5. The measuring instrument as claimed in claims 1 or 2, characterized in that the carriage is driven by a motor via a crank drive.

* * * * *